US010222258B2

(12) United States Patent
Lund

(10) Patent No.: US 10,222,258 B2
(45) Date of Patent: Mar. 5, 2019

(54) DIGITAL IMAGING AND PULSE DETECTION PIXEL

(71) Applicant: Sensors Unlimited, Inc., Princeton, NJ (US)

(72) Inventor: Joshua Lund, Dallas, TX (US)

(73) Assignee: Sensors Unlimited, Inc., Princeton, NJ (US)

( * ) Notice: Subject to any disclaimer, the term of this patent is extended or adjusted under 35 U.S.C. 154(b) by 187 days.

(21) Appl. No.: 15/255,514

(22) Filed: Sep. 2, 2016

(65) Prior Publication Data

US 2016/0370226 A1  Dec. 22, 2016

Related U.S. Application Data

(63) Continuation-in-part of application No. 14/672,295, filed on Mar. 30, 2015, now Pat. No. 9,698,182.

(51) Int. Cl.
G01J 1/44 (2006.01)
G01S 7/48 (2006.01)
G01S 7/486 (2006.01)

(52) U.S. Cl.
CPC ............... G01J 1/44 (2013.01); G01S 7/4804 (2013.01); G01S 7/4863 (2013.01)

(58) Field of Classification Search
CPC .......................... H01L 27/14609; G01J 1/44
See application file for complete search history.

(56) References Cited

U.S. PATENT DOCUMENTS 4,529,886 A  7/1985  Yokoyama et al.
5,659,360 A  8/1997  Mori et al.
(Continued)

FOREIGN PATENT DOCUMENTS

EP           0658047 A1   6/1995
WO    WO-2013108204 A1   7/2013

OTHER PUBLICATIONS

Fraenkel, R.; Berkowicz, E.; Bykov, L.; Dobromislin, R.; Elishkov, R.; Giladi, A.;Grimberg,I.; I. Hirsh, E. Ilan, C. Jacobson, I. Kogan, P. Kondrashov, P.; Nevo, I.; Pivnik, I. and Vasserman, S.: *High Definition 10pm pitch in GaAs detector with Asynchronous Laser Pulse Detection Mode*; SemiConductor Devices, P.O. Box 2250, Haifa 31021, Israel; Infrared Technology and Applications XLII, edited by Bjorn F. Andresen, Gabor F. Fulop, Charles M. Hanson, Paul R. Norton, Proc. of SPIE vol. 9819, 981903, © 2016 SPIE, CCC code: 0277-786X/16/$18, doi: 10.1117/12.2222762. Proc. of SPIE vol. 9819 981903-1.
(Continued)

*Primary Examiner* — Thanh Luu
(74) *Attorney, Agent, or Firm* — Locke Lord LLP; Scott D. Wofsy; Judy R. Naamat

(57) ABSTRACT

An imaging and pulse detection pixel and an array of imaging and pulse detection pixels are provided. Each imaging and pulse detection pixel includes an optical detection device connected directly to a first and second transistor only, a pulse detection circuit that operates on the signal read out from the optical detection device and outputs a pulse detection output signal suitable for detection of pulses, and an imaging circuit that operates on a signal read out from the optical detection device and outputs an image output signal suitable for generation of an image. A terminal of the optical detection device is directly connected to only a gate terminal of the first transistor and a non-gate terminal of the second transistor.

18 Claims, 4 Drawing Sheets

(56) References Cited

U.S. PATENT DOCUMENTS

| | | | |
|---|---|---|---|
| 6,642,495 | B2 | 11/2003 | Lowrance et al. |
| 6,864,965 | B2 | 3/2005 | DeFlumere |
| 7,608,823 | B2 | 10/2009 | Tennant |
| 7,858,939 | B2 | 12/2010 | Tener et al. |
| 8,426,828 | B2 | 4/2013 | Dierickx |
| 8,581,168 | B2 | 11/2013 | Linder et al. |
| 8,716,643 | B2 | 5/2014 | Eldesouki et al. |
| 8,829,404 | B1 | 9/2014 | Rinker |
| 9,052,381 | B2 | 6/2015 | Woolaway et al. |
| 9,207,053 | B2 | 12/2015 | Ell et al. |
| 9,215,386 | B2 | 12/2015 | Elkind et al. |
| 9,229,096 | B2 | 1/2016 | Kim et al. |
| 2012/0305786 | A1* | 12/2012 | Dierickx ............ G01J 1/44 250/371 |
| 2014/0346154 | A1 | 11/2014 | Blei et al. |
| 2015/0009337 | A1 | 1/2015 | Minlong |
| 2015/0268345 | A1 | 9/2015 | Ell |
| 2016/0054434 | A1 | 2/2016 | Williams et al. |
| 2016/0057366 | A1 | 2/2016 | Lee et al. |
| 2016/0161587 | A1 | 6/2016 | Caplan |
| 2017/0207262 | A1 | 7/2017 | Lin et al. |
| 2017/0208265 | A1 | 7/2017 | Lin et al. |
| 2017/0208266 | A1 | 7/2017 | Lin et al. |

OTHER PUBLICATIONS

Shkedy(1) L.; Koifman(1) A.; Gildr, A.; Tuito(2), A.; Ilarr, E.; Grimberg(1), I.; Hirsh(1), I.; Bykov(1), L.; Elishkov(1'), R.; Fraenkel(i), R. and Vassermanm, S.: *Multi-Function InGaAs Detector for SWIR Imaging*, OPTRO-2014-2930312 , (1)SemiConductor Devices P.O. Box 2250, Haifa 31021, Israel; (2)Israel MOD.

Extended European Search Report for European Patent Application EP17188607.0, dated Jan. 30, 2018.

Davidovic M et al: "Range finding sensor in 90nm CMOS with bridge correlator based background light suppression", 2010 Proceedings of the ESSCIRC, Sep. 14, 2010 (Sep. 14, 2010), pp. 298-301, XP031788368, ISBN: 978-1-4244-6662-7.

Fraenkel, R.; Aronov, D.; Benny, Y.; Berkowicz, E.; Bykov, L.; Calahorra, Z.; Fishman, T; Giladi, A.; Ilan,E.; Klipstein, P.; Langof, L.; Lukomsky, I.; Mistele*, D.; Mizrahi, U.; Nussinson, D.; Twittlo**, A.; Yassen, M. and Zemel, A.: *SCD's Cooled and Uncooled Photo Detectors for NIR-SWIR*, SemiConductor Devices P.O. Box 2250, Haifa 31021, Israel, * Faculty of Electrical Engineering, Technion, ** IMOD, Proc. SPIE, vol. 8353, Infrared Technology and Applications XXXVIII Conference, pp. 835305, https://doi.org/10.1117/12.918098, May 2012.

Shkedy, L.; Rai Fraenkel, R.; Fishman, T.; Giladi, A.; Bykov, L.; Grimberg, I.; Ilan, E.; Vasserman, S. and Alina Koifman, A: *Multi-function InGaAs detector with on-chip signal processing*, SemiConductor Devices P.O. Box 2250, Haifa 31021, Israel, Proc. SPIE, vol. 8704, Infrared Technology and Applications XXXIX, pp. 87042I, http://spie.org/Publications/Proceedings/Paper/10.1117/12.2015580, Jun. 2013.

Langof(1) L.; Nussinson(1) D. Ilan(1), E.; Elkind(1), S.; Dobromislin(1), R.; Nevo, I.; Khinich(1), F.;Labilov(1), M.; Calahorra(1), Z.; Vaserman(1), S.; Markovitz(1), T.; Twitto(z), A.; Oster(2), D.: *Multi-function IR detector with on-chip signal processing*, (1)SemiConductor Devices, P.O. Box 2250, Haifa 31021, Israel, Email: lidia_langof@scd.co.il <mailto:lidia_langof@scd.co.il>; (2)Israeli Ministry of Defence (IMOD), Israel, Email: avit000Pgmail.com <http://avit000Pgmail.com> <<mailto_avit000@gmail.com>>, OPTRO, Feb. 2012.

Langof, L.; Nussinson, D. Ilan, E.; Elkind, S.; Dobromislin, R.; Nevo, I.; Khinich, F.; Labilov, M.; Calahorra, Z.; Vaserman, S.; Markovitz, T.; Manelaaa, 0.; Elooza, D.; Twittob, A.; Osterb, D.: *Advanced multi-function Infrared detector with on-chip processing*, aSemiConductor Devices, P.O. Box 2250, Haifa 31021, Israel, Elbit Systems, Electro-Optics El-Op Ltd. P.O. Box1165, Rehovot 76111, Israel; bisraeli Ministry of Defence (IMOD), Israel, CD Proc. SPIE, vol. 8012, Infrared Technology and Applications XXXVII Conference, pp. 80120F-80120F-13, https://doi.org/10.1117/12.883248, Apr. 2011.

* cited by examiner

DIGITAL IMAGING AND PULSE DETECTION PIXEL

CROSS REFERENCE TO RELATED APPLICATION

This application is a continuation-in-part of U.S. patent application Ser. No. 14/672,295, filed Mar. 30, 2015, which is incorporated herein by reference in its entirety.

TECHNICAL FIELD

The present disclosure relates generally to image sensing and pulse detection circuitry, and more particularly to an implementation of an imaging pixel including imaging sensing and pulse detection on a single chip.

BACKGROUND

Infrared detector systems, LIDAR (laser illuminated detection and ranging) systems, and imaging systems in industrial processes utilize imaging pixel arrays and pulse detection pixel arrays to detect the presence of a laser pulse within an image. The properties of the laser pulse can then be analyzed by a controller to determine pertinent information such as a distance of the laser pulse, the time period of the laser pulse, or any other information needed by the controller.

Existing imaging and pulse detecting systems utilize distinct imaging circuits and pulse detection circuits, with each of the circuits have different architectures. Due to the distinct architectures, the imaging portion and the pulse detection portion do not interoperate and require the utilization of two distinct circuits within each pixel, one for each function. The dual chip configuration of existing pixels results in lager pixel sizes and increases the weight of the pixel array.

SUMMARY OF THE INVENTION

Disclosed is an imaging and pulse detection array including: a plurality of pixels connected to a controller, the controller being configured to generate an image based on an image signal originating from each pixel in the plurality of pixels and configured to detect a pulse on at least one of the pixels in the plurality of pixels, and each of the pixels in the plurality of pixels including an imaging circuit and a pulse detection circuit, the imaging circuit and the pulse detection circuit including a shared circuit architecture, and wherein the imaging circuit and the pulse detection circuit include a shared portion.

Also disclosed is a method for operating a pixel for an imaging and pulse detection array including: detecting a light input at a shared optical detection input and passing the light input through at least one additional shared circuit element, providing an output from the at least one shared circuit element to an imaging circuit and to a pulse detection circuit, wherein the imaging circuit and the pulse detection circuit share a circuit architecture, and outputting an imaging signal from the imaging circuit to a controller, and outputting a pulse detection signal from the pulse detection circuit to a pulse processing circuit.

In accordance with aspects of the disclosure, an imaging and pulse detection pixel and an array of imaging and pulse detection pixels are disclosed. Each imaging and pulse detection pixel includes an optical detection device connected directly to a first and second transistor only, a pulse detection circuit that operates on the signal read out from the optical detection device and outputs a pulse detection output signal suitable for detection of pulses, and an imaging circuit that operates on a signal read out from the optical detection device and outputs an image output signal suitable for generation of an image. A terminal of the optical detection device is directly connected to only a gate terminal of the first transistor and a non-gate terminal of the second transistor.

These and other features of the present invention can be best understood from the following specification and drawings, the following of which is a brief description.

DETAILED DESCRIPTION OF AN EMBODIMENT

Imaging systems, including imaging systems with laser pulse detection features, utilize an array of pixels to capture and analyze an image. Typically within each array, every pixel is approximately identical. In some exemplary pixel arrays, each pixel includes a pulse detection system and an imaging system.

Figure 1:
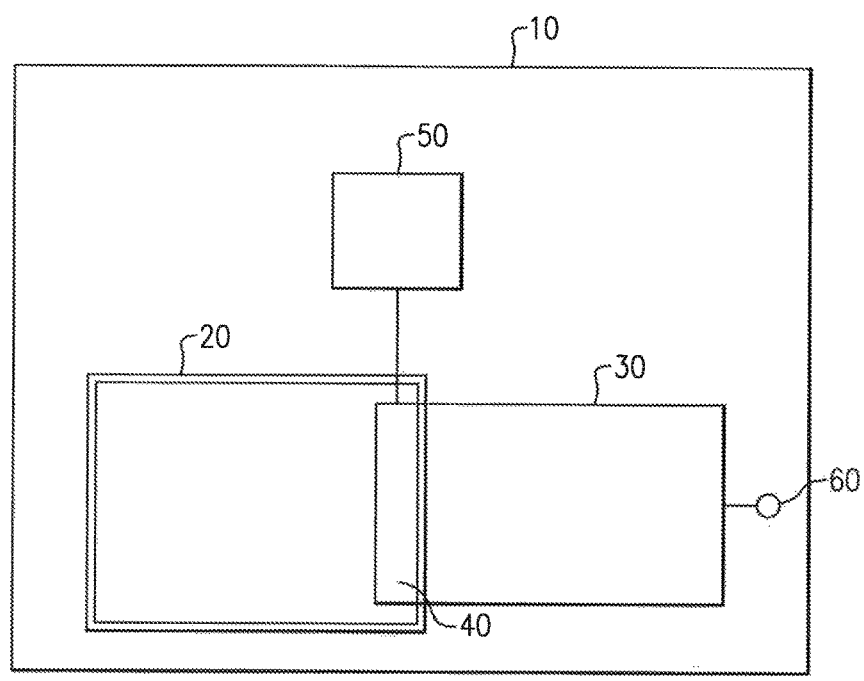
FIG. 1 schematically illustrates an imaging and pulse detection pixel according to one example.

FIG. 1 schematically illustrates a pixel 10 for utilization in an imaging system with laser pulse detection. The pixel 10 includes a pulse detection circuit 20 and an imaging circuit 30. Also included within the pixel 10 is a pulse processing circuit 50 connected to one or both of the imaging circuit 30 and the pulse detection circuit 20. In the example pixel 10 of FIG. 1, the pulse detection circuit 20 and the imaging circuit 30 utilize the same circuit architecture and are mounted on a single integrated circuit chip. In some examples, the single integrated circuit chip can be a readout integrated circuit (ROIC) chip. In alternative examples, the single integrated circuit can be a different type of integrated circuit chip, as required by a given system.

The pulse processing circuit 50 is a digital logic circuit and is connected in a manner that allows the digital logic circuit to receive a pulse detection signal from the pulse detection circuit 20. When the pulse processing circuit 50 receives pulse detection, the pulse processing circuit 50 applies digital logic and processing to the pulse detection signal to generate a pulse detection output for a controller. In some examples the output can include a timestamp and coordinate address encoded signal identifying the pixel where the pulse is detected. In other examples, the output can be any other processed pulse detected signal. The pulse detected signal is provided to an external controller that analyzes data from all the pixels in the pixel array.

An image output 60 extends from the imaging circuit 30, and connects the image circuit 30 to the controller. The controller utilizes the image signal from the pixel 10, in conjunction with the image signal from each other pixel in the pixel array, to construct an image. The construction of the image by the controller can be done in any known manner and utilizing any known imaging technique.

As both the imaging circuit 30 and the pulse detection circuit 20 utilize the same architecture, it is possible to utilize a single instance of redundant portions of the image circuit 30 and the pulse detection circuit 20. As a result, portions of the circuit are shared between the imaging circuit 30 and the pulse detection circuit 20. The shared portions 40 are illustrated as an overlapping circuit portion in the example of FIG. 1.

In a practical implementation, the imaging circuit 30 and the pulse detection circuit 20 include multiple additional inputs and outputs, as is conventionally known in the imaging arts. The additional inputs and outputs provide reference voltages and currents, ground connections and the like.

Figure 2:
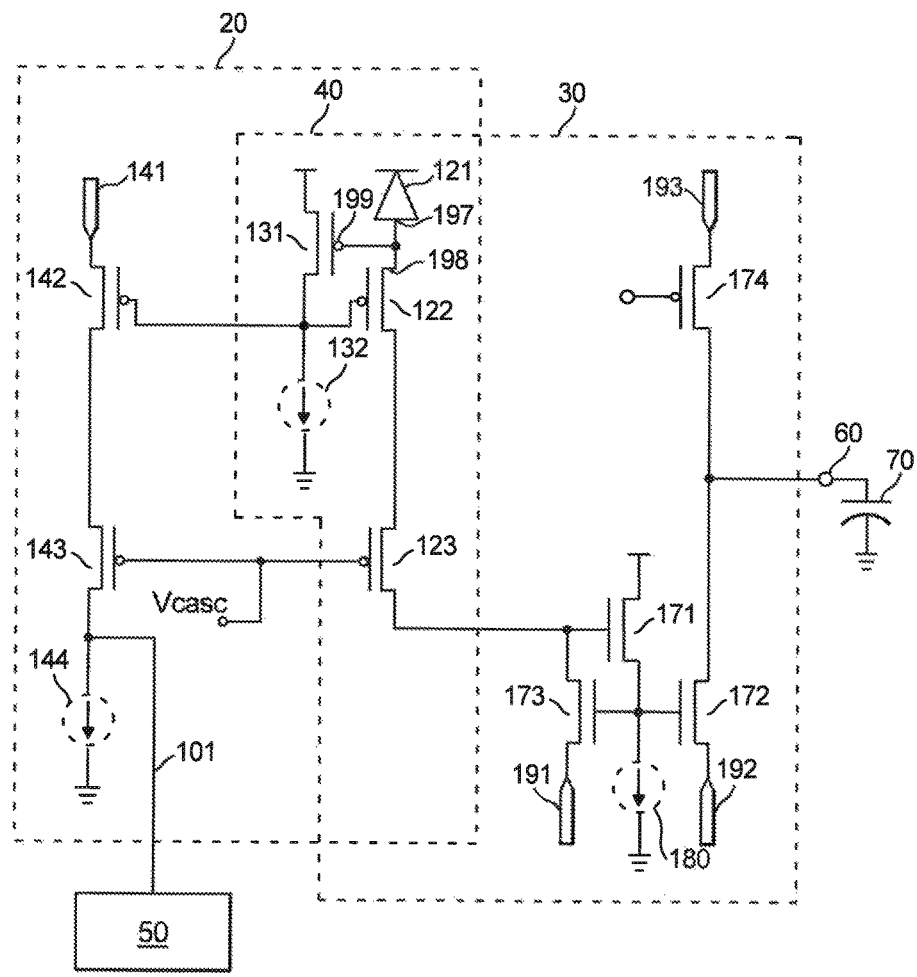
FIG. 2 schematically illustrates an exemplary topology for the imaging and pulse detection pixel of FIG. 1.

With continued reference to FIG. 1, and with like numerals indicating like elements, FIG. 2 schematically illustrates an exemplary topology for the imaging and pulse detection pixel 10 of FIG. 1. The circuit topology includes the pulse detection circuit 20 and the imaging circuit 30, with an overlapping shared portion 40 as described above.

Included in the overlapping shared portion 40 is an optical detection device 121, such as a light sensing diode. In alternative examples, alternative optical sensing devices can be utilized to the same effect. The optical detection device 121 in the illustrated example is reverse biased. In such an example, the optical detection device 121 conducts a current when light strikes the optical detection device, providing the light detection portion of both the imaging circuit 30 and the pulse detection circuit 20. Connected to the anode of the optical detection device 121 is an amplifier 122. In the illustrated example, the amplifier is in the form of a voltage controlled switch. In one example, the voltage controlled switch is an FET transistor. In alternative examples, other type of voltage controlled switches or other types of amplifiers may be utilized. Further included within the shared portion 40 is a switching element 131 and a current source 132. The switching element 131 and the current source 132 regulate the reverse-bias of the optical detection device 121.

A cascode FET 123 including a switching device, such as a P-channel FET operated in the saturation region, connects the amplifier 142 to an output 101. The output 101 is, in turn, connected to the pulse processing circuit 50. In alternative examples, alternative current sources including a switching device can be utilized in place of the illustrated P-channel FET operated in the saturation region. In some embodiments, the cascode FET 143 requires a match with a cascode FET 123 in the pulse detection circuit 20. The cascode FET 143 can substantially increase the impedance at node 101 to the pulse processing circuit 50 and establish desired amplification properties for the pulse detection circuit 20.

The pulse detection circuit 20 uses a configuration of switching elements 131, 142, 143, current sources 132, 144, and reference voltages 141 in conjunction with the shared circuit components (the amplifier 122 and the cascode FET 123) to form a complete pulse detection circuit 20 that provides a pulse detection output to an output 101. Similar pulse detection circuits are understood within the art, and the specific pulse detection topology illustrated in FIG. 2 can be altered depending on the specific needs of a given pulse detection system.

The cascode FET 123 in the shared portion 40 is included in an imaging circuit 30 including voltage controlled switches 171, 172, 173, 174, a current source 180, and reference inputs 191, 192, 193. The output of the cascode FET 123 controls the state of a first voltage controlled switch 171. The voltage controlled switches 171 and 172 form a current mirror with current gain controlled by the difference between the reference voltages 191, 192. Voltage controlled switch 171 and current source 180 form a lag-mitigation circuit which provides beneficial effects of accelerating the signal response when imaging with a dark background.

The inclusion of the reference voltage 192 inserts a gain into the system. An output 60 provides imaging data to a controller (not pictured). The controller interprets the imaging data from the illustrated pixel, and each other pixel in the pixel array, to generate an overall image. A reference voltage 193 provides a reset signal to reset the imaging circuit 30 when imaging data has been received at the controller 190. The reference voltage 193 is connected to the remainder of the imaging circuit 30 via a voltage controlled switch 174 when the voltage controlled switch 174 is on. The on/off state of the voltage controlled switch 174 is controlled by the external controller.

In some examples, the output 60 is connected to an optional integration capacitor 70, which in turn connects to the controller. In such an example, the integration capacitor provides filtering to the imaging output.

In the above example, the switches and current sources of the imaging circuit 30 and the pulse detection circuit 20 utilize the same architecture, and are able to be integrated into a single overall circuit, as is illustrated in FIG. 2. While a specific topology of the imaging circuit 30 and the pulse detection circuit 20 are illustrated in the example of FIG. 2, one of skill in the art, having the benefit of this disclosure, will understand that alternate topologies of either or both, with the alternate topologies sharing an architecture, could similarly be utilized. One of skill in the art, having the benefit of this disclosure will further understand that the specific gains, resistances, voltages, and the like, of each circuit component in the imaging circuit 30 and the pulse detection circuit 20 can be adjusted or modified to achieve recognized alterations to the gains and impedances of the corresponding circuits.

Figure 3:
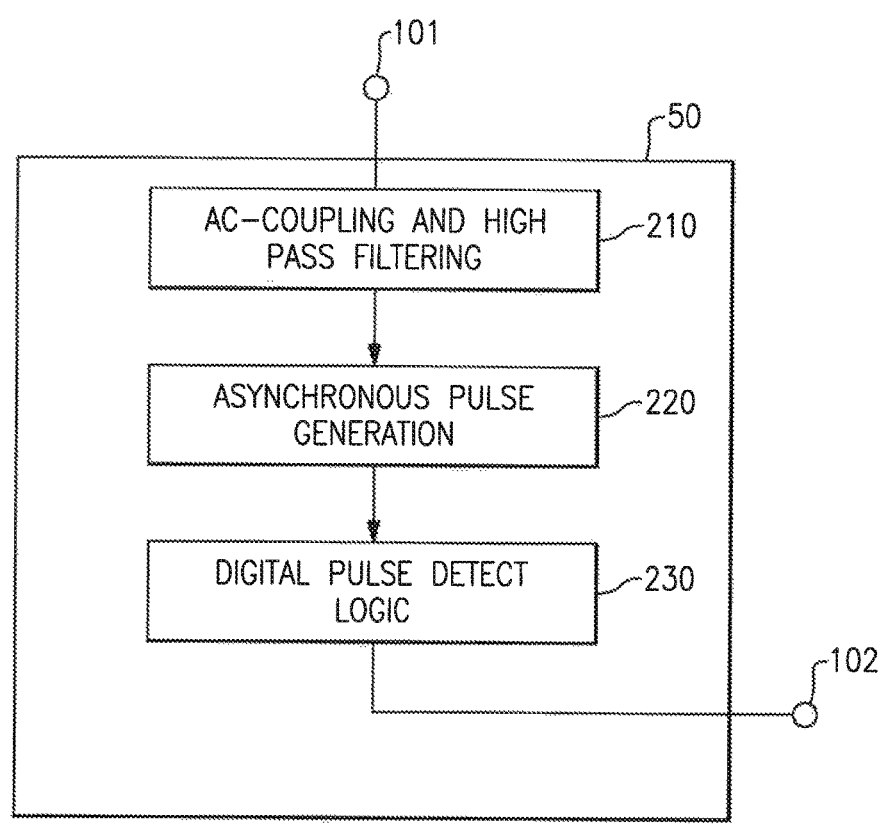
FIG. 3 schematically illustrates a pulse processing element of the pixel of FIGS. 1 and 2.

As described above, with regards to FIG. 1, the pulse detection circuit 20 provides an output to a digital logic based pulse processing circuit 50. The digital pulse processing circuit 50 includes multiple digital processing elements, such as digital logic circuits, that prepare a detected pulse for utilization by the controller. FIG. 3, schematically illustrates the digital pulse processing features described in the pixel of FIGS. 1 and 2. The digital processing circuit 50 includes at least three components, an AC-coupling and high pass filtering process 210, an asynchronous pulse generation process 220 and a digital pulse detect logic process 230. Alternative digital pulse processing circuits can include additional processes.

Initially, the digital pulse detection signal is received at the digital pulse processing circuit 50 from the output 101 of the pulse detection circuit 20. The signal is passed to the AC-coupling and high pass filtering process 210, which pre-processes the signal to place the signal in a condition for digital analysis from the remaining two processes 220, 230. The AC-coupling and high pass filtering process 210 removes low frequencies from the signal, and does not perform any analysis of the signal for pulses.

Once the pre-processing has been completed, the pulse detection signal is passed to the asynchronous pulse generation logic process 220. The asynchronous pulse generation logic uses a digital logic process to analyze the output of the pulse detection circuit asynchronously with (independently of) the imaging process utilized by the attached controller. By way of example, the asynchronous pulse generation process 220 can include identifying if a pulse occurred, if the pixel is in a subset of pixels where a pulse was expected to occur, or any similar means of limiting or reducing the number of pixels to be analyzed by a controller for a pulse signal.

The output of the asynchronous pulse generation logic is provided to the digital pulse detection logic process 230. The digital pulse detection logic applies the generated pulse from the asynchronous pulse generation process 220 to a digital logic circuit. The digital logic circuit determines if a pulse is detected at the light sensing element 121. When a pulse is detected, the digital pulse detect logic 230 outputs a pulse signal to a controller through an output 102.

As a result of the digital processing included within the pulse processing circuit 50, the imaging and pulse detection chip only outputs pulse data to the controller when a pulse is detected by the light sensing element 50. In this way, the processing requirement of the controller is reduced.

With returned reference to FIG. 2, the optical detection device 121 is shown to be connected to a readout circuit that reads out signals output by the optical detection device 121 in response to optical detection device 121 sensing light. The readout circuit connects a terminal 197 of the optical detection device 121 directly to only two devices, namely amplifier 122 and switching element 131. As previously submitted, the amplifier 122 can be a voltage controlled switch, e.g., a FET transistor. In the embodiment shown in FIG. 2, the amplifier 122 is included in a single-ended amplifier formed by a transistor, such as a PMOS or NMOS FET.

More specifically, FIG. 2 shows that the terminal 197 of the optical detection device 121 is connected to amplifier 122 at a non-gate terminal 198, and to the switching element 131 at its gate terminal 199. The non-gate terminal 198 is a source or drain, depending on whether the amplifier 122 uses a PMOS or NMOS transistor. As FIG. 2 is not restricted to a particular topology, one skilled in the art would recognize that the terminal 197 of the optical detection device 121 that connects to the amplifier 122 and the switching element 131 can be an anode or a cathode.

FIG. 2 further shows that the optical detection device 121, amplifier 122, and switching element 131 are all included in the shared portion 40. The signal output by the optical detection device 121 is read out by the amplifier 122 and the switching element 131 to a remaining portion of the pulse detection circuit 20 and a remaining portion of the imaging circuit 30, meaning the amplifier 122 and the switching element 131 operate on the signal output by the optical detection device 121 and pass the signal to the remaining portion. The remaining portions of the pulse detection circuit 20 and the imaging circuit 30 refer to portions of the pulse detection circuit 20 and the imaging circuit 30 that are not included in the shared portion 40.

Figure 4:
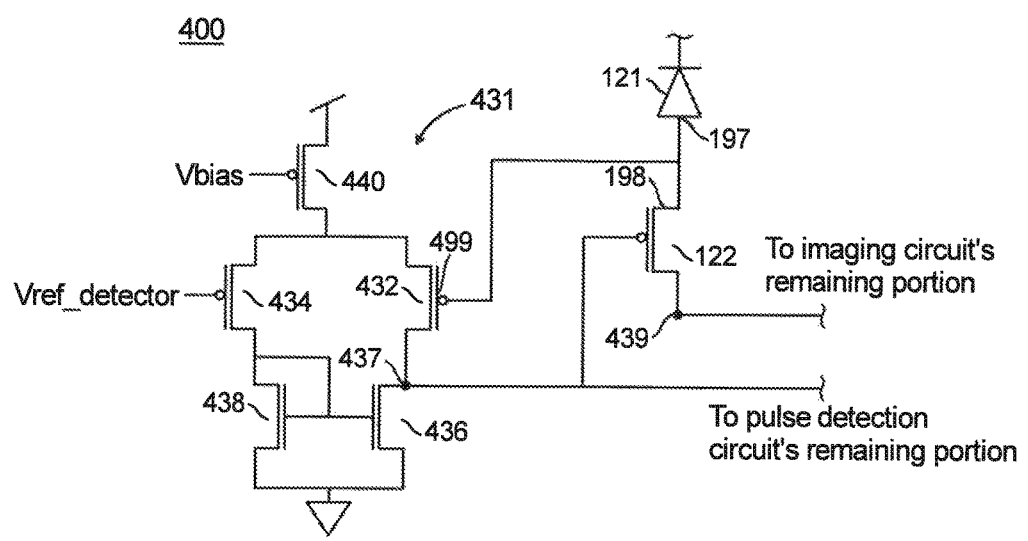
FIG. 4 schematically illustrates an example topology for the imaging and pulse detection pixel of FIG. 1 in accordance with embodiments of the disclosure.

With reference to FIG. 4, a further embodiment of the pixel is shown and designated by reference numeral 400. Pixel 400 is similar to pixel 10 shown in FIG. 2, however pixel 400 includes a differential amplifier 431 that reads out signals output by the optical detection device 121 to the remaining portion of the pulse detection circuit 20, rather than switching element 131 and current source 132 shown in FIG. 2. As shown in FIG. 2, switching element 131 and current source 132 can be described as forming the single-ended amplifier, wherein switching element 131 can be described as an amplifier input device of the single-ended amplifier, and current source 132 can be described as a current control device of the single-ended amplifier shown in FIG. 2. Accordingly, differential amplifier 431 shown in FIG. 4 replaces the single-ended amplifier formed by switching element 131 and current source 132 shown in FIG. 2.

In the example shown, differential amplifier 431 includes a first transistor 432, a second transistor 434, a third transistor 436 (e.g., a load transistor) and fourth transistor 438 (e.g., a load transistor), and a current bias implemented as a fifth transistor 440. The first, second and fifth transistors 432, 434, and 440 are shown in the example to be PMOS transistors, and the third and fourth transistors 436 and 438 are shown in the example to be NMOS transistors. The sources of the first transistor 432 and the second transistor 434 are coupled to one another, and further coupled to a drain of the fifth transistor 440. A bias voltage Vbias is applied to a gate of the fifth transistor. Gates of the third and fourth transistors 436 and 438 are coupled and further connected to a node between drains of the second and fourth transistors 434, 438. Sources of the third and fourth transistors 436 and 438 are coupled and tied to ground or an equivalent voltage. Drains of the second and fourth transistors 434, 438 are coupled to one another and drains of the first and third transistors 432, 436 are coupled to one another. A reference voltage Vref_detector is applied to a gate of the second transistor 434.

While a specific topology of the pixel 400 is shown in FIG. 4 and described, one of skill in the art, having the benefit of the disclosure, will understand that alternate components and topologies could be used as implementations of the differential amplifier 431. For example, NMOS devices can be used in place of PMOS devices, and PMOS devices can be used in place of NMOS devices, with appropriate couplings between devices, as would be known to one of skill in the art.

The differential amplifier 431 reads out the signal output by the optical detection device 121, including amplifying a high frequency signal output by the optical detection device 121 and passing the amplified, high frequency signal to the remaining portion of the pulse detection circuit 20 from node 437 of the differential amplifier 431, wherein node 437 is coupled between the drains of the first and third transistors 432 and 436. The amplifier 122, which can be described as a current control device, reads out the signal output by the optical detection device 121, including passing the signal output by the optical detection device 121 to the remaining portion of the imaging circuit 30 from node 439, wherein node 439 is connected to a drain of amplifier 122. Additionally, node 437 is connected to the gate of amplifier 122.

Further, while described and illustrated above as only a single embodiment of a single type of imaging and pulse detection circuit, one of skill in the art and having the benefit of this disclosure will recognize that any other type of imaging and pulse detection circuit could be utilized in conjunction with the above teaching to form a similar single chip pulse detection and imaging circuit for utilization within a single pixel.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:
1. An imaging and pulse detection pixel comprising:
an optical detection device connected directly to a first and second transistor only;

a pulse detection circuit that operates on a first signal for detection of a pulse, the first signal being read out from the optical detection device and at least the first transistor; and an imaging circuit that operates on a second signal for generation of an image, the second signal being read out from the optical detection device and at least the second transistor, wherein a terminal of the optical detection device is directly connected to only a gate terminal of the first transistor and a non-gate terminal of the second transistor.

2. The imaging and pulse detection pixel of claim 1, wherein the terminal of the optical detection device is an anode or cathode, and the non-gate terminal of the second transistor is a source or drain.

3. The imaging and pulse detection pixel of claim 1, wherein the optical detection device and the first and second transistors are included in a portion of the imaging and pulse detection pixel that is shared by the pulse detection circuit and the imaging circuit.

4. The imaging and pulse detection pixel of claim 3, wherein the first and second signals are provided to a remaining portion of the pulse detection circuit and imaging circuit, respectively, wherein the remaining portions of the imaging circuit and the pulse detection circuit are not included in the shared portion.

5. The imaging and pulse detection pixel of claim 1, wherein the first transistor is included in an amplifier.

6. The imaging and pulse detection pixel of claim 5, wherein the amplifier is a single ended amplifier.

7. The imaging and pulse detection pixel of claim 5, wherein the amplifier is a differential amplifier.

8. The imaging and pulse detection pixel of claim 1, further comprising a pulse processing circuit, wherein output from the pulse detection circuit is provided to the pulse processing circuit that identifies a presence of a pulse in the output from the pulse detection circuit.

9. An imaging and pulse detection pixel array, the imaging pixel array comprising:
a plurality of imaging and pulse detection pixels, each of the imaging and pulse detection pixels comprising:
an optical detection device connected directly to a first and second transistor only;
a pulse detection circuit that operates on a first signal for detection of a pulse, the first signal being read out from the optical detection device and at least the first transistor; and
an imaging circuit that operates on a second signal for generation of an image, the second signal being read out from the optical detection device and at least the second transistor,
wherein a terminal of the optical detection device is directly connected to only a gate terminal of the first transistor and a non-gate terminal of the second transistor.

10. The imaging and pulse detection pixel array of claim 9, wherein the terminal of the optical detection device is an anode or cathode, and the non-gate terminal of the second transistor is a source or drain.

11. The imaging and pulse detection pixel array of claim 9, wherein the optical detection device and the first and second transistors are included in a portion of the imaging and pulse detection pixel that is shared by the pulse detection circuit and the imaging circuit.

12. The imaging and pulse detection pixel array of claim 11, wherein the first and second signals are provided to a remaining portion of the pulse detection circuit and imaging circuit, respectively, wherein the remaining portions of the imaging circuit and the pulse detection circuit are not included in the shared portion.

13. The imaging and pulse detection pixel array of claim 9, wherein the first transistor is included in an amplifier and the second transistor is a switching element.

14. The imaging and pulse detection pixel array of claim 13, wherein the amplifier is a single ended amplifier.

15. The imaging and pulse detection pixel array of claim 13, wherein the amplifier is a differential amplifier.

16. The imaging and pulse detection pixel array of claim 9, further comprising a pulse processing circuit, wherein output from the pulse detection circuit is provided to the pulse processing circuit that identifies a presence of a pulse in the output from the pulse detection circuit.

17. The imaging and pulse detection pixel array of claim 9, wherein the imaging and pulse detection array is provided on a single integrated chip.

18. The imaging and pulse detection pixel array of claim 17, wherein the single integrated chip is a readout integrated circuit (ROIC).

* * * * *